(12) United States Patent
Iijima

(10) Patent No.: US 10,353,350 B2
(45) Date of Patent: Jul. 16, 2019

(54) SERVO CONTROL SYSTEM HAVING FUNCTION OF MEASURING CHARACTERISTIC OF LEARNING CONTROLLER

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 59 days.

(21) Appl. No.: 15/278,508

(22) Filed: Sep. 28, 2016

(65) Prior Publication Data
US 2017/0090433 A1 Mar. 30, 2017

(30) Foreign Application Priority Data

Sep. 30, 2015 (JP) .................. 2015-193872

(51) Int. Cl.
*G05B 13/02* (2006.01)
*G05B 19/402* (2006.01)
(Continued)

(52) U.S. Cl.
CPC ....... *G05B 13/0265* (2013.01); *G05B 19/402* (2013.01); *G06F 17/11* (2013.01); *G06N 20/00* (2019.01); *G05B 2219/39303* (2013.01)

(58) Field of Classification Search
CPC .............. G05B 13/0265; G05B 19/402; G05B 2219/39303; G06F 17/11; G06N 99/005
(Continued)

(56) References Cited

U.S. PATENT DOCUMENTS 4,675,805 A * 6/1987 Freymann .......... G05B 23/0202
700/42
5,019,763 A * 5/1991 Komatsu .............. G05B 19/184
318/39
(Continued)

FOREIGN PATENT DOCUMENTS

JP 2002304219 A 10/2002
JP 2004280772 A 10/2004
JP 2010123018 A 6/2010

OTHER PUBLICATIONS

Inoue, T., et al., "High Accuracy Control of Play-Back Servo Systems," Institute of Electrical Engineers of Japan, C, vol. 101, No. 4, Apr. 1, 1981, pp. 89-96, with English translation, 24 pgs.
(Continued)

*Primary Examiner* — Abdelmoniem I Elamin
(74) *Attorney, Agent, or Firm* — Fredrickson & Byron, P.A.

(57) ABSTRACT

A servo control system includes a position command generator; a position detector of among other things, a feed shaft; a position control loop; a learning controller including a band limiting filter and a dynamic characteristic compensation element; a sine wave sweep input unit for the position control loop; and a frequency characteristic calculator for estimating the gain and phase of position control loop input and output signals. The frequency characteristic calculator calculates an evaluation function that indicates the characteristic of a position control based on the frequency characteristic of the position control loop, the band limiting filter, and the dynamic characteristic compensation element.

1 Claim, 4 Drawing Sheets

(51) Int. Cl.
*G06F 17/11* (2006.01)
*G06N 20/00* (2019.01)
(58) Field of Classification Search
USPC .......................................................... 700/275
See application file for complete search history.

(56) References Cited

U.S. PATENT DOCUMENTS

| | | | | |
|---|---|---|---|---|
| 5,060,175 A | * | 10/1991 | Cubalchini | G01C 11/02 33/318 |
| 2003/0205984 A1 | * | 11/2003 | Yoshida | G05B 19/404 318/801 |
| 2016/0292349 A1 | * | 10/2016 | Kainuma | G05B 19/401 |

OTHER PUBLICATIONS

English Abstract and Machine Translation for Japanese Publication No. 2010-123018 A, published Jun. 3, 2010, 17 pgs.
English Abstract and Machine Translation for Japanese Publication No. 2004-280772 A, published Oct. 7, 2004, 16 pgs.
English Abstract and Machine Translation for Japanese Publication No. 2002-304219 A, published Oct. 18, 2002, 11 pgs.

* cited by examiner

US 10,353,350 B2

SERVO CONTROL SYSTEM HAVING FUNCTION OF MEASURING CHARACTERISTIC OF LEARNING CONTROLLER

This application is a new U.S. patent application that claims benefit of JP 2015-193872 filed on Sep. 30, 2015, the content of 2015-193872 is incorporated herein by reference.

BACKGROUND OF THE INVENTION

1. Field of the Invention

The present invention relates to a servo control system, and in particular relates to a servo control system that has the function of measuring the characteristic of a learning controller.

2. Description of Related Art

In recent years, techniques related to learning control have been in practical use in machine tools. The learning control is, in brief, a control that optimizes a feedforward signal with respect to certain repeated operations. By performing the same operations in a repeated manner, the feedforward signal is updated and finally converges to a certain form. Learning is ended at that point in time, and the feedforward signal obtained by the learning control is used as is without update.

The principle of high accuracy control of repeated operations using a learning control is reported (for example, Tadashi Inoue et al.: High Accuracy Control of Play-Back Servo Systems, the Institute of Electrical Engineers of Japan. C, Vol. 101, No. 4, pp. 89-96, (1981), hereinafter called "non-patent document 1"). In the non-patent document 1, an evaluation function itself is derived. However, non-patent document 1 does not describe the technique of measuring a frequency response of servo systems and an experimental modal analysis, and hence calculates only a nominal characteristic.

SUMMARY OF THE INVENTION

The purpose of the present invention is to provide a servo control system that allows selecting learning parameters that match mechanical characteristics and operation conditions by visualizing the convergence of learning and responsivity to a disturbance, which are important in a learning control.

A servo control system according to an embodiment of the present invention is for a machine tool having a feed shaft driven by a servomotor. The servo control system includes a position command generator for generating a position command to drive the feed shaft in a specific repeated operation pattern; a position detector for detecting the position of the feed shaft; a positional deviation obtainer for obtaining a position command value generated by the position command generator and a position detection value detected by the position detector, and calculating a positional deviation that is the difference between the position command value and the position detection value; a position control loop including the position command generator, the position detector, and the positional deviation obtainer; a band limiting filter for attenuating a high frequency component of the positional deviation outputted from the positional deviation obtainer; a dynamic characteristic compensation element for advancing the phase of the positional deviation outputted from the band limiting filter; a learning controller including the band limiting filter and the dynamic characteristic compensation element; a sine wave sweep input unit for performing a sine wave sweep to the position control loop; and a frequency characteristic calculator for estimating the gain and phase of position control loop input and output signals from the output of the position control loop when sine waves are inputted to the position control loop. The frequency characteristic calculator calculates an evaluation function that indicates the characteristic of a position control including the learning controller, based on the measurement value of the frequency characteristic of the position control loop, the band limiting filter, and the dynamic characteristic compensation element.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

Figure 1:
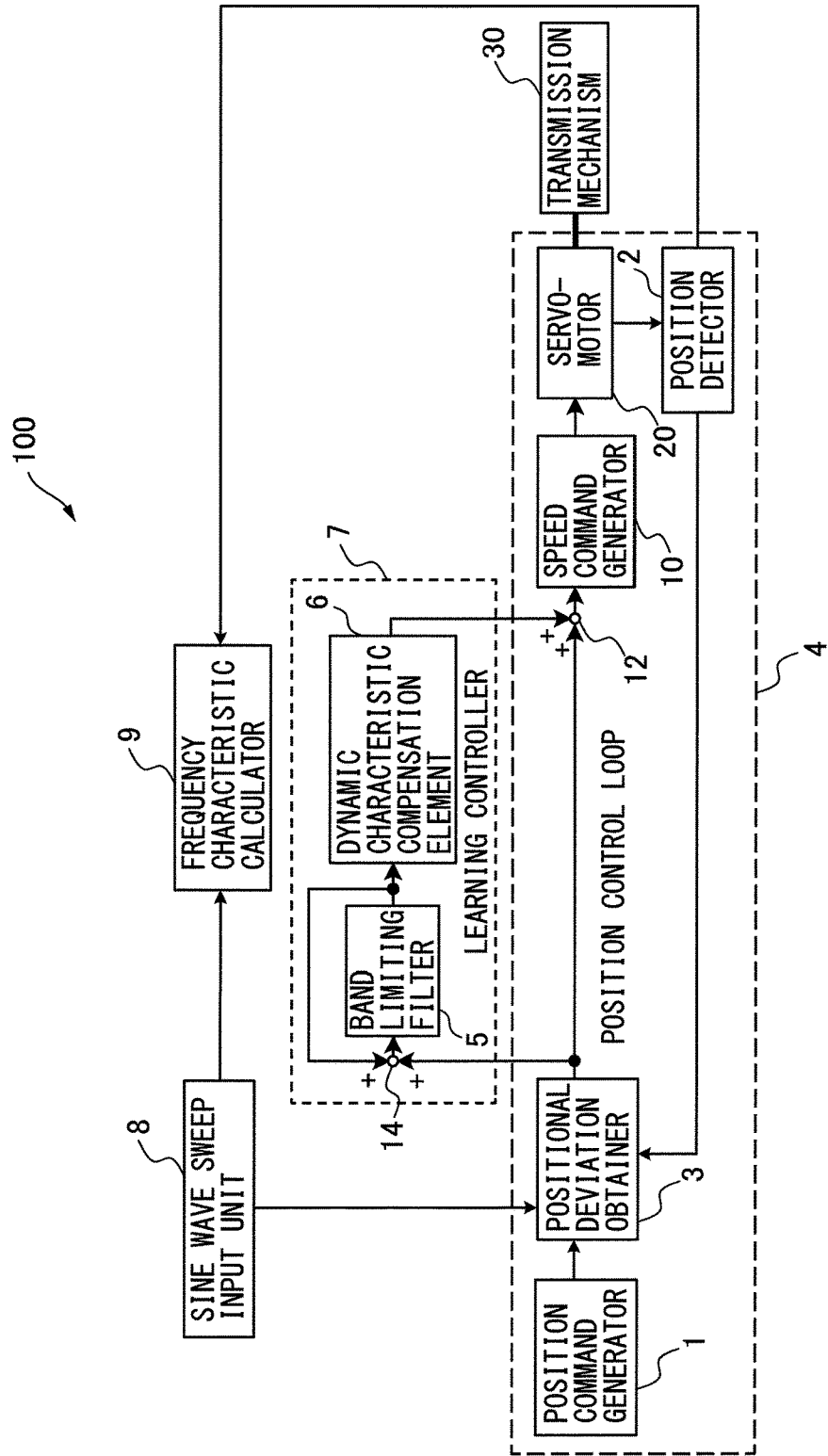
FIG. 1 is a block diagram of a servo control system according to an embodiment of the present invention.

A servo control system according to the present invention will be described below with reference to the drawings. FIG. 1 is a block diagram of a servo control system 100 according to an embodiment of the present invention. The servo control system 100 according to a first embodiment of the present invention, which is a servo control system for a machine tool having a feed shaft driven by a servomotor, includes a position command generator 1, a position detector 2, a positional deviation obtainer 3, a position control loop 4, a band limiting filter 5, a dynamic characteristic compensation element 6, a learning controller 7, a sine wave sweep input unit 8, and a frequency characteristic calculator 9.

The position command generator 1 generates a position command to make a servomotor 20 drive the feed shaft in a specific repeated operation pattern through a transmission mechanism 30. The position command generated by the position command generator 1 is outputted to the positional deviation obtainer 3.

The position detector 2 detects the position of the feed shaft. An encoder or a resolver is usable as the position detector 2, but the position detector 2 is not limited thereto. A position detection value of the feed shaft detected by the position detector 2 is outputted to the positional deviation obtainer 3.

The positional deviation obtainer 3 obtains a position command value generated by the position command generator 1 and the position detection value detected by the position detector 2, and calculates a positional deviation, that is, the difference between the position command value and the position detection value. The position command generator 1, the position detector 2, and the positional deviation obtainer 3 described above constitute a position control loop 4.

The band limiting filter 5 attenuates a high frequency component of the positional deviation outputted from the positional deviation obtainer 3. The band limiting filter 5 is a low-pass filter for cutting a signal of a high frequency range in a specific frequency range, and has the effect of stabilizing a control system.

The dynamic characteristic compensation element 6 advances the phase of the positional deviation outputted from the band limiting filter 5. The dynamic characteristic compensation element 6 is a filter that advances the phase of a signal of a high frequency range in a specific frequency range and increases a gain, and thus has the function of compensating a delay in the control system and a reduction in the gain. The band limiting filter 5 and the dynamic characteristic compensation element 6 described above constitute a learning controller 7.

The sine wave sweep input unit 8 performs a sine wave sweep of the position control loop 4. For example, the sine wave sweep input unit 8 may input a disturbance of sine waves to the positional deviation obtainer 3, which constitutes the position control loop 4. However, the sine wave sweep is not limited to this example.

The frequency characteristic calculator 9 estimates the gain and phase of position control loop input and output signals from the output of the position control loop 4 when the sine waves are inputted to the position control loop 4. The frequency characteristic calculator 9 calculates an evaluation function that indicates the characteristic of a position control including the learning controller 7, from the measurement value of the frequency characteristic of the position control loop 4, the band limiting filter 5, and the dynamic characteristic compensation element 6.

The frequency characteristic calculator 9 may represent the frequency characteristic of the position control loop 4 using one rigid body mode and at least one resonance mode.

Figure 2:
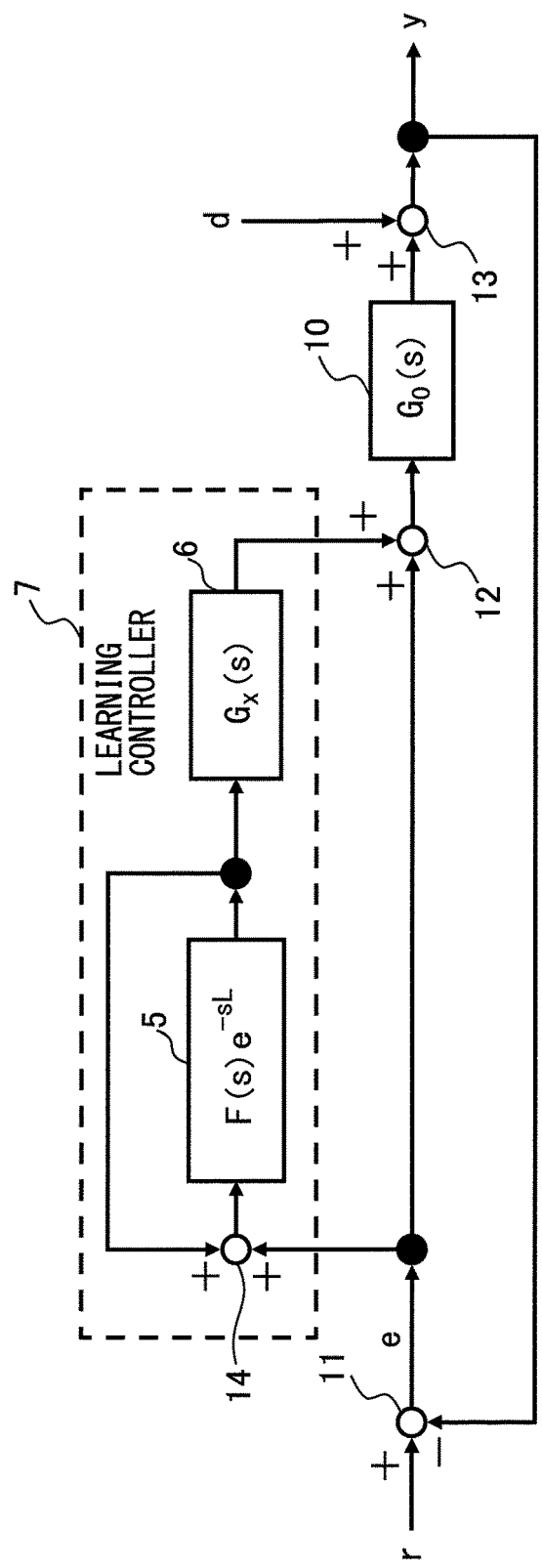
FIG. 2 is a block diagram of a learning controller of the servo control system according to the embodiment of the present invention.

Next, the configuration of the learning controller 7 will be described with reference to FIG. 2. Upon inputting a position command r to a subtracter 11, the subtracter 11 calculates a positional deviation e that is the difference between the position command r and an actual position y detected by the position detector. A first adder 14 of the learning controller 7 adds a correction amount of a previous pattern period stored in a delay memory (not shown) provided in the band limiting filter 5 to the positional deviation e. The band limiting filter 5 applies a filtering process to the output of the first adder 14 to obtain a correction amount. The band limiting filter 5 is represented by $F(s)e^{-sL}$, using a learning period L. The dynamic characteristic compensation element ($G_x(s)$) 6 compensates a phase delay and a gain reduction of an object to be controlled, and the learning controller 7 outputs the correction amount to a second adder 12. The second adder 12 adds this correction amount to the positional deviation e. A speed command generator 10 multiplies the sum of the correction amount and the positional deviation e by a position gain $G_0(s)$ of a normal servo (position and speed control system), to generate a speed command. Note that, in the example of FIG. 2, a disturbance d is added to the speed command in a third adder 13.

Next, the calculation of an evaluation function, which indicates the characteristic of a position control including the learning controller 7, by the frequency characteristic calculator 9 from the measurement value of the frequency characteristic of the position control loop 4, the band limiting filter 5, and the dynamic characteristic compensation element 6 will be described.

First, it is found out that, due to the provision of the learning controller, each angular frequency component of a final deviation after a lapse of sufficient time with synchronous input significantly reduces the final deviation with respect to a control deviation of a basic servo system. Also, in a filtering range of $|F(j\omega)| \ll 1$, the characteristic of the final deviation depends on the response of the basic servo system (non-patent document 1). Note that, the synchronous input refers to that r+d has a fixed value relative to the learning period L, or a period is equal to the learning period L or an integral submultiple of the learning period L.

Here, $G(j\omega)$ is represented by the following equation (1):

$$G(j\omega) = \frac{G_x(j\omega)G_0(j\omega)}{1 + G_0(j\omega)} \quad (1)$$

An index $A_T(\omega)$ that represents the convergence of a transient deviation is represented by the following equation (2):

$$A_T(\omega) = |F(j\omega)[1 - G(j\omega)]| \quad (2)$$

The lower the index $A_T(\omega)$, the quicker a transient response component converges at a root in the vicinity of $j\omega$. "$A_T=1$" indicates that the amplitude of a response component is constant without converging.

Figure 3:
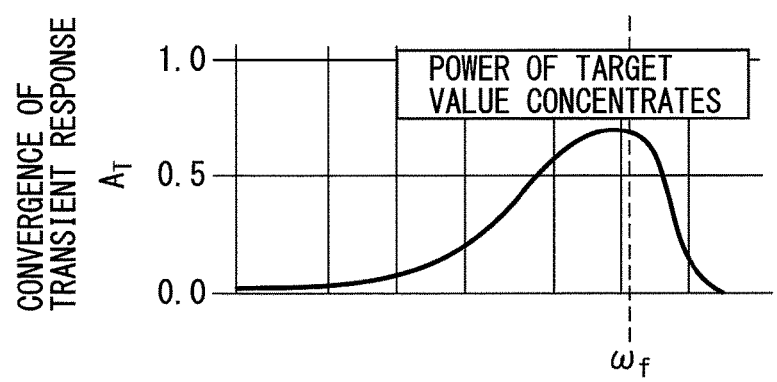
FIG. 3 is a graph showing the convergence of a transient response of the servo control system according to the embodiment of the present invention.

FIG. 3 shows an example of the characteristic value $A_T(\omega)$. It is found out that the value of $A_T(\omega)$ is low at low frequencies on which the power of a target value concentrates, and therefore the transient deviation is well converged thereat.

Here, $G_0$ is measurable, and $G_x$ and F can be defined by mathematical expressions. Thus, $A_T$ can be calculated based on measurement. Therefore, according to the servo control system of the embodiment of the present invention, it is possible to measure the servo-control characteristic of the servo control system having the learning controller, including its mechanical characteristics.

Figure 4:
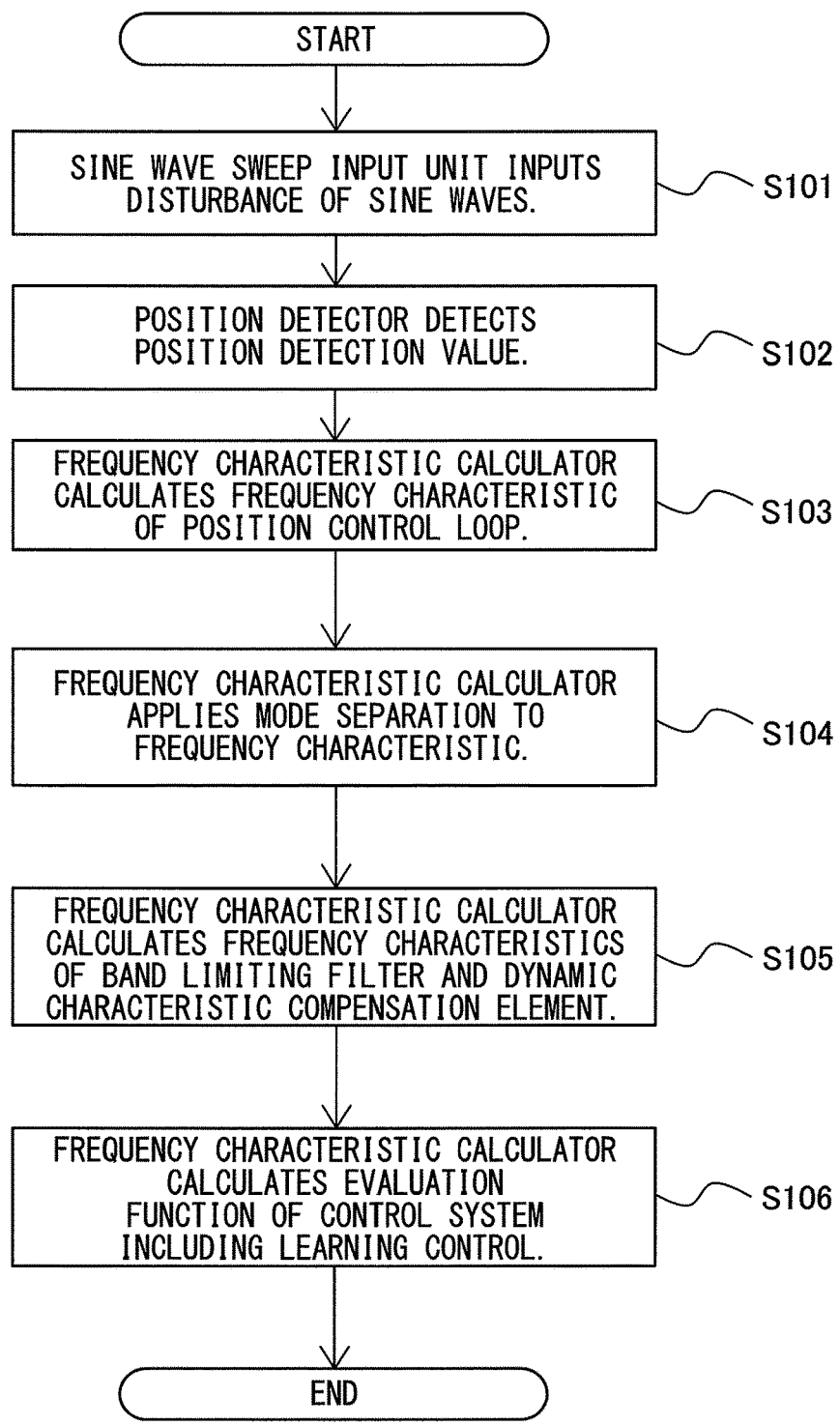
FIG. 4 is a flowchart of the operation process of the servo control system according to the embodiment of the present invention.

Next, the operation process of the servo control system according to the embodiment of the present invention will be described with reference to a flowchart of FIG. 4. First, in step S101, the sine wave sweep input unit 8 inputs a disturbance of sine waves.

Next, in step S102, the position detector 2 detects a position detection value.

Next, in step S103, the frequency characteristic calculator 9 calculates the frequency characteristic of the position control loop 4.

Next, in step S104, the frequency characteristic calculator 9 applies mode separation to the frequency characteristic. To represent a frequency transfer function in a rigid body mode and a plurality of resonance modes using the technique of an experimental modal analysis, a specific constant is calculated in each mode. Curve fitting using peak values or half-widths of resonance curves is the simplest method for identifying the resonance modes. However, another identification method may be used instead.

Next, in step S105, the frequency characteristic calculator 9 calculates the frequency characteristics of the band limiting filter 5 and the dynamic characteristic compensation element 6.

Next, in step S106, the frequency characteristic calculator 9 calculates an evaluation function of a control system including a learning control.

As described above, the present invention allows selecting learning parameters that match mechanical characteristics and operation conditions by visualizing the convergence of learning and responsivity to a disturbance, which are important in a learning control.

What is claimed is:

1. A servo control system for a machine tool having a feed shaft driven by a servomotor, comprising:
   a position command generator for generating a position command to drive the feed shaft in a specific repeated operation pattern;
   a position detector for detecting the position of the feed shaft;
   a positional deviation obtainer for obtaining a position command value generated by the position command generator and a position detection value detected by the position detector, and calculating a positional deviation that is the difference between the position command value and the position detection value;
   a position control loop including the position command generator, the position detector, and the positional deviation obtainer;
   a band limiting filter for attenuating a high frequency component of the positional deviation outputted from the positional deviation obtainer;
   a dynamic characteristic compensation element for advancing the phase of the positional deviation outputted from the band limiting filter;
   a learning controller including the band limiting filter and the dynamic characteristic compensation element;
   a sine wave sweep input unit for performing a sine wave sweep to the position control loop; and
   a frequency characteristic calculator for estimating the gain and phase of position control loop input and output signals from the output of the position control loop when sine waves are inputted to the position control loop, wherein
   the frequency characteristic calculator calculates an evaluation function that indicates the characteristic of a position control including the learning controller based on the measurement value of the frequency characteristic of the position control loop, the band limiting filter, and the dynamic characteristic compensation element, and
   the frequency characteristic calculator represents the frequency characteristic of the position control loop in one rigid body mode and at least one resonance mode, and calculates the evaluation function on the basis of a peak value and a half-width of the characteristic of the resonance mode.

* * * * *